(12) United States Patent
Clifford et al.

(10) Patent No.: US 11,014,064 B2
(45) Date of Patent: May 25, 2021

(54) STRUCTURED PACKING MODULE FOR MASS TRANSFER COLUMNS

(71) Applicant: KOCH-GLITSCH, LP, Wichita, KS (US)

(72) Inventors: Scott Clifford, Wichita, KS (US); Malcolm Talbot, Wichita, KS (US); Izak Nieuwoudt, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 187 days.

(21) Appl. No.: 15/966,668

(22) Filed: Apr. 30, 2018

(65) Prior Publication Data

US 2018/0318787 A1 Nov. 8, 2018

Related U.S. Application Data

(60) Provisional application No. 62/500,033, filed on May 2, 2017.

(51) Int. Cl.
*B01J 19/32* (2006.01)
*B01D 3/00* (2006.01)

(52) U.S. Cl.
CPC .............. *B01J 19/32* (2013.01); *B01D 3/008* (2013.01); *B01J 2219/3085* (2013.01);
(Continued)

(58) Field of Classification Search
CPC ... B01D 3/008; B01J 19/32; B01J 2219/3085; B01J 2219/32203; B01J 2219/3221;
(Continued)

(56) References Cited

U.S. PATENT DOCUMENTS 3,963,810 A * 6/1976 Holmberg ............... B01J 19/32
261/112.2
4,296,050 A * 10/1981 Meier .................... B01D 59/02
165/166
(Continued)

FOREIGN PATENT DOCUMENTS

CN 103691388 A 4/2014
CN 102008935 B 9/2014
(Continued)

OTHER PUBLICATIONS

International Search Report and Written Opinion received for PCT application No. PCT/IB2018/052997, dated Jul. 19, 2018, 11 pages.
(Continued)

*Primary Examiner* — Charles S Bushey

(57) ABSTRACT

A cross-corrugated structured packing element is provided for use in mass transfer or heat exchange columns. The packing element has a plurality of packing layers positioned in an upright, parallel relationship to each other and including corrugations formed of alternating peaks and valleys and corrugation sidewalls extending between the peaks and valleys. The packing element also includes a plurality of apertures each presenting an open area. The apertures are distributed such that the corrugation sidewalls have a greater density of open areas than any density of the open areas that may be present in the peaks and valleys. Some of the apertures may be present in the peaks and the valleys to facilitate liquid distribution. The apertures may also be placed in rows or other patterns that are aligned in a direction along a longitudinal length of the corrugations. Regions with a larger apex radius may be formed in the peaks, such as by depressing spaced-apart segments of the peaks to form spacers in the undepressed portions of the peaks. Some of the apertures may be positioned in the
(Continued)

transitions from the depressed portions of the peaks to the unmodified apex sections.

22 Claims, 14 Drawing Sheets

(52) U.S. Cl.
CPC .................. *B01J 2219/3221* (2013.01); *B01J 2219/3222* (2013.01); *B01J 2219/3284* (2013.01); *B01J 2219/32203* (2013.01); *B01J 2219/32213* (2013.01); *B01J 2219/32217* (2013.01); *B01J 2219/32227* (2013.01); *B01J 2219/32237* (2013.01); *B01J 2219/32244* (2013.01); *B01J 2219/32265* (2013.01); *B01J 2219/32272* (2013.01)

(58) Field of Classification Search
CPC .... B01J 2219/32213; B01J 2219/32217; B01J 2219/3222; B01J 2219/32227; B01J 2219/32237; B01J 2219/32244; B01J 2219/32265; B01J 2219/32272; B01J 2219/3284
USPC .......................................... 261/112.2, DIG. 72
See application file for complete search history.

(56) References Cited

U.S. PATENT DOCUMENTS

| | | | | |
|---|---|---|---|---|
| 4,668,443 A | * | 5/1987 | Rye | ........................ B01D 47/00 165/166 |
| 5,413,741 A | | 5/1995 | Buchholz et al. | |
| 5,632,934 A | * | 5/1997 | Billingham | .............. B01J 19/32 261/112.2 |
| 5,876,638 A | | 3/1999 | Sunder et al. | |
| 6,119,481 A | * | 9/2000 | Sunder | ...................... B01J 19/30 261/112.2 |
| 6,509,082 B1 | | 1/2003 | McKeigue et al. | |
| 6,511,053 B2 | * | 1/2003 | Kaibel | ..................... B01J 19/32 261/112.2 |
| 6,713,158 B2 | * | 3/2004 | McKeigue | ............ A61F 13/496 428/195.1 |
| 7,025,339 B2 | | 4/2006 | Meski et al. | |
| 7,476,297 B2 | * | 1/2009 | Kaibel | ................... B01D 3/009 202/158 |
| D854,132 S | * | 7/2019 | Nieuwoudt | .................. D23/358 |
| 2003/0094713 A1 | | 5/2003 | Sunder et al. | |
| 2004/0135270 A1 | | 7/2004 | Lantz et al. | |
| 2004/0188867 A1 | * | 9/2004 | Meski | ...................... B01J 19/32 261/94 |
| 2013/0233016 A1 | * | 9/2013 | Wilson | ................. F25J 3/04909 62/643 |
| 2015/0238926 A1 | * | 8/2015 | Raynal | ..................... B01J 19/32 261/112.2 |

FOREIGN PATENT DOCUMENTS

| | | |
|---|---|---|
| EP | 0 270 050 A2 | 6/1988 |
| WO | WO2004030809 A1 | 4/2004 |
| WO | 2018/203224 A1 | 11/2018 |

OTHER PUBLICATIONS

International Preliminary Report on Patentability received for PCT Application No. PCT/IB2018/052997, dated Nov. 14, 2019, 9 pages.

* cited by examiner

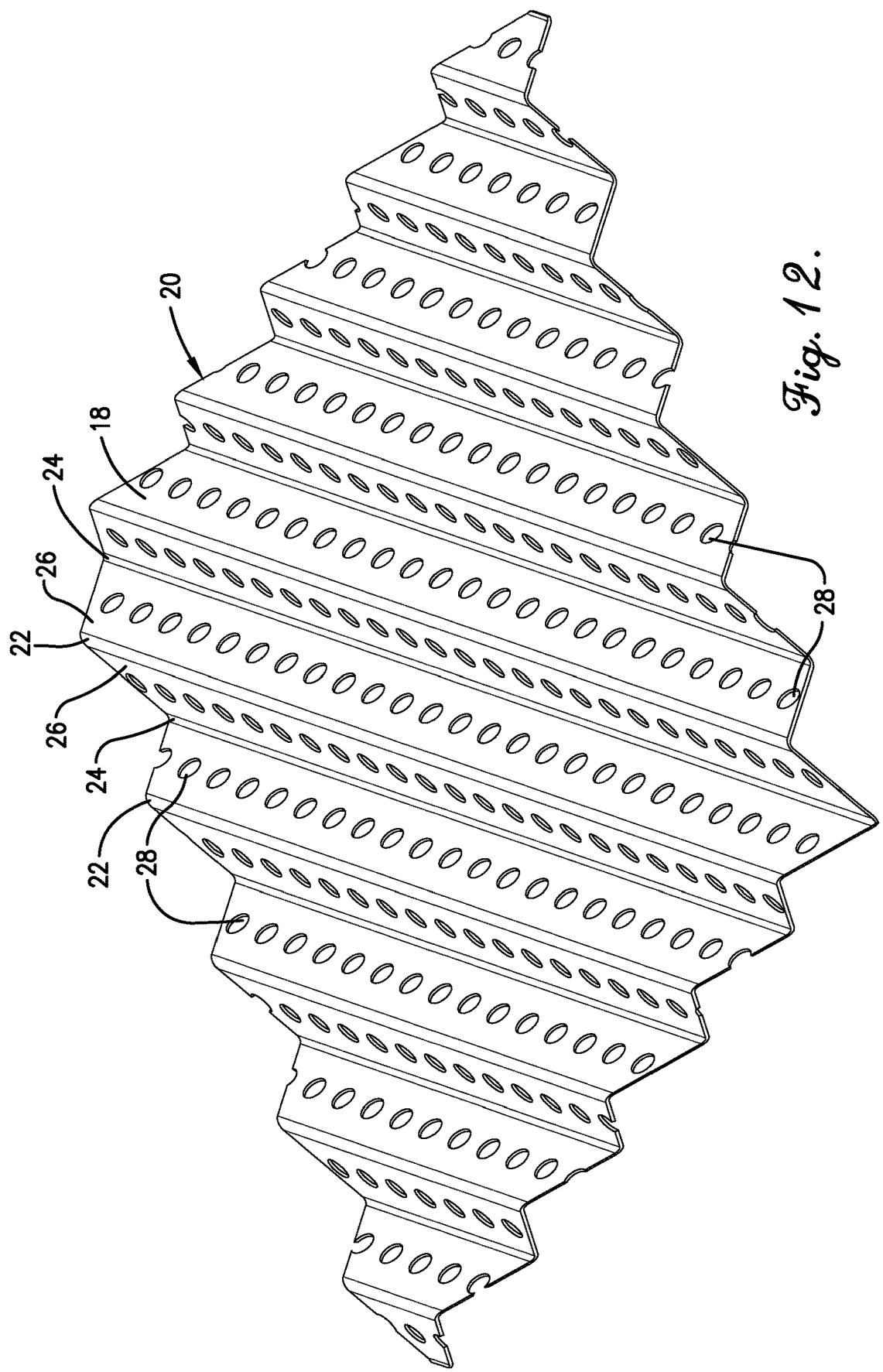

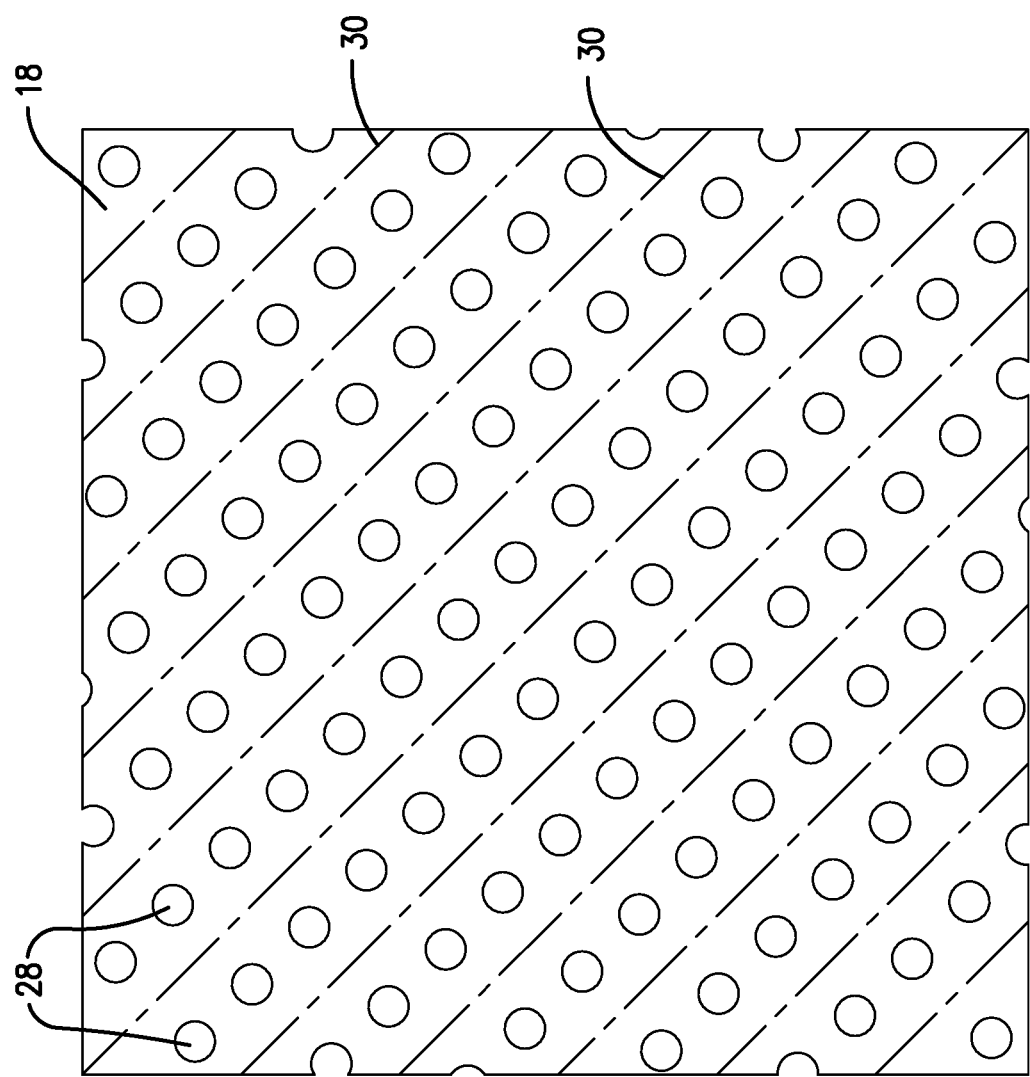

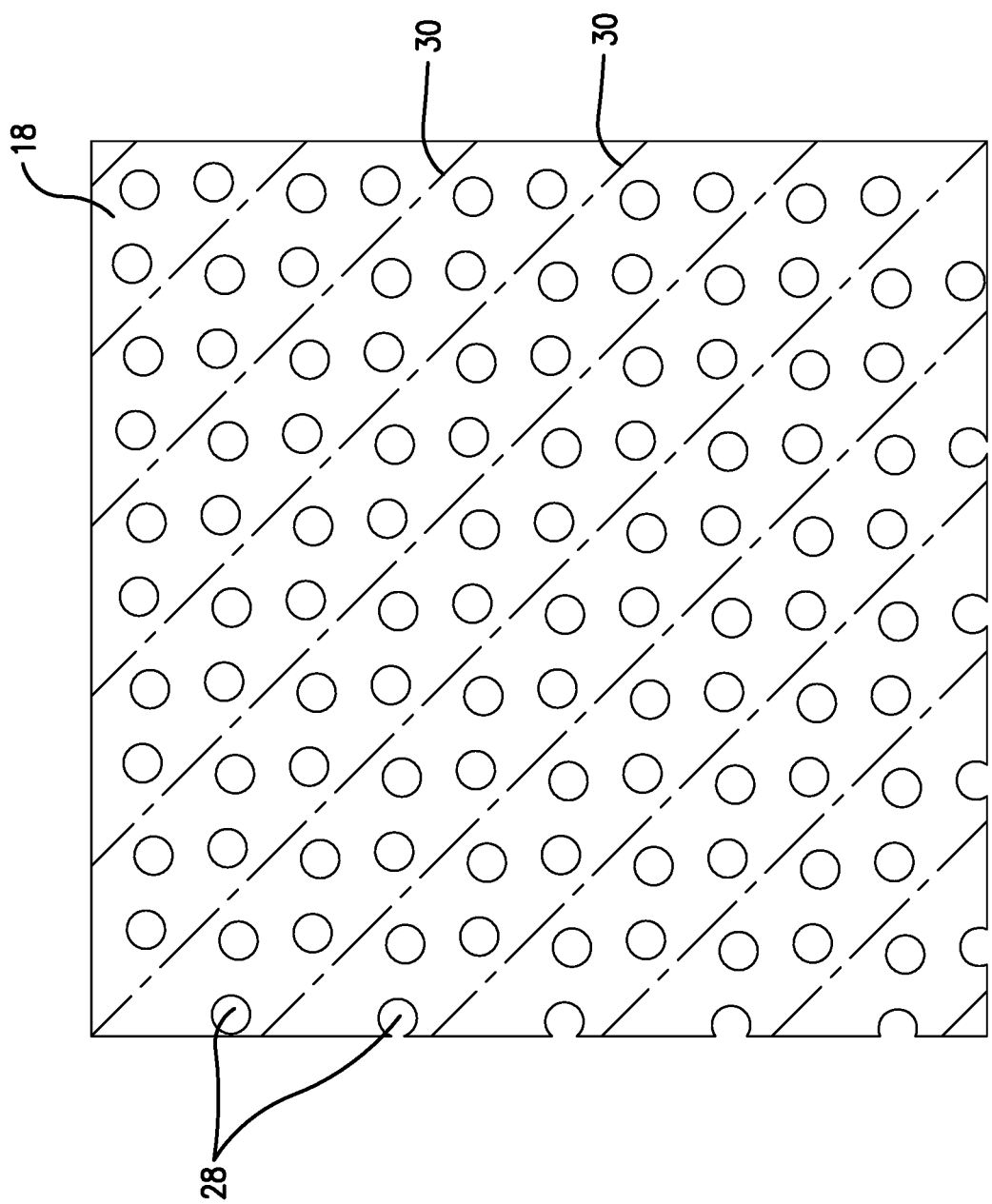

STRUCTURED PACKING MODULE FOR MASS TRANSFER COLUMNS

CROSS REFERENCE TO RELATED APPLICATIONS

This present application claims priority to U.S. Provisional Patent Application No. 62/500,033 filed May 2, 2017 the disclosures of which are incorporated by reference herein.

BACKGROUND

The present invention relates generally to mass transfer columns and, more particularly, to structured packing used to facilitate mass and heat transfer between fluids in such columns.

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along multiple mass transfer surfaces disposed within the column. Commonly, these transfer surfaces are defined by structures placed in the interior volume of the column that are configured to facilitate intimate contact between the two fluid phases. As a result of these transfer surfaces, the rate and/or degree of mass and heat transferred between the two phases is enhanced.

Structured packing is commonly used to provide heat and/or mass transfer surfaces within a column. Many different types of structured packing exist, and most include a plurality of corrugated structured packing sheets that are positioned in an upright, parallel relationship and are joined together to form a structured packing module with fluid passages formed along the crisscrossing corrugations of adjacent sheets. The structured packing module may itself form a structured packing layer that fills a horizontal internal cross section of the column or the packing module may be in the form of individual bricks that are positioned end-to-end and side-by-side to form the structured packing layer. Multiple structured packing layers are normally stacked on top of each other with the orientation of the sheets in one layer rotated with respect to the sheets in adjacent structured packing layers.

It is generally desirable to maximize mass and energy transfer between the vapor and liquid phases as they flow through the structured packing layer; this is typically achieved by increasing the specific surface area available for mass and energy transfer. However, fluids passing through a structured packing layer having a higher specific surface area will normally experience a higher pressure drop, which is undesirable from an operational standpoint.

A need thus exists for an improved structured packing that is able to achieve a reduction in pressure drop without a significant decrease in mass and energy transfer efficiency. This allows one to either produce a packing with a lower pressure drop and the same efficiency, or to increase the packing's specific surface area, thereby increasing efficiency, without significantly increasing the pressure drop of the packing.

SUMMARY

In one aspect, the present invention is directed to a structured packing module comprising a plurality of structured packing sheets positioned in an upright, parallel relationship to each other. Each structured packing sheet has corrugations formed of alternating peaks and valleys and corrugation sidewalls that extend between adjacent ones of the peaks and valleys. The structured packing sheets are constructed and arranged such that the corrugations of each one of the structured packing sheets extend at an oblique angle to the corrugations of each adjacent one of the structured packing sheets and a specific surface area of the structured packing sheets in the structured packing module is generally greater than 100 $m^2/m^3$. The structured packing module also includes a plurality of apertures for allowing passage of fluid through the structured packing sheets. The apertures in each one of the structured packing sheets is open to each adjacent one of the packing sheets and is substantially unimpeded. The apertures are distributed in each one of the structured packing sheets such that the corrugation sidewalls have a greater density of open areas formed by the apertures than any density of any of the open areas that may be present in the peaks and valleys.

In another aspect, the present invention is directed to a mass transfer or heat exchange column in which the above-described packing module is placed.

In a further aspect, the present invention is directed to a method of effecting mass transfer and/or heat exchange between fluids flowing through the above-described packing module.

BRIEF DESCRIPTION OF THE DRAWINGS

In the accompanying drawings that form part of the specification and in which like numbers are used to indicate like components in the various views:

FIG. 12 is a fragmentary perspective view of a ninth embodiment of a structured packing sheet of the present invention having a single row of apertures on each corrugation sidewall and with a larger number of smaller apertures than in the embodiment shown in FIG. 4;

FIG. 13 is a fragmentary plan view of a flat sheet in which the apertures have been formed prior to crimping to form a structured packing sheet having a single row of apertures on each corrugation sidewall; and FIG. 14 is a fragmentary plan view of a flat sheet similar to FIG. 13 but showing a double row of apertures that will be present in each corrugation sidewall following crimping of the sheet.

DETAILED DESCRIPTION

Figure 1:
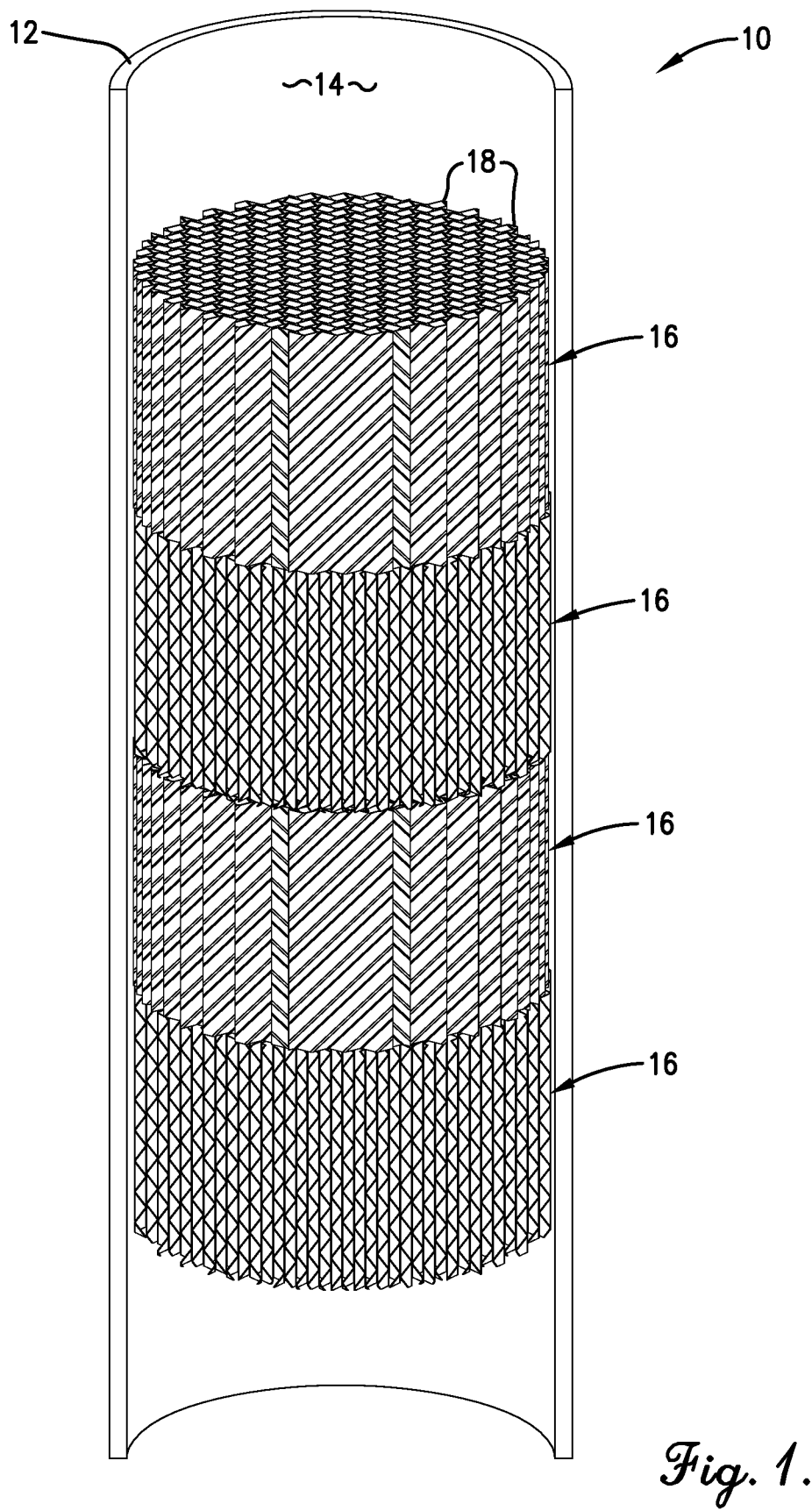
FIG. 1 is a fragmentary side elevation view of a mass transfer column with the column shell taken in vertical section to show structured packing layers of the present invention positioned in a stacked arrangement within the column.

Turning now to the drawings in greater detail and initially to FIG. 1, a mass transfer column suitable for use in mass transfer and heat exchange processes is represented generally by the numeral 10. The mass transfer column 10 includes an upright, external shell 12 that is generally cylindrical in configuration, although other configurations, including polygonal, are possible and are within the scope of the present invention. Shell 12 is of any suitable diameter and height and is constructed from one or more rigid materials that are desirably inert to, or are otherwise compatible with, the fluids and conditions present during operation of the mass transfer column 10.

The shell 12 of the mass transfer column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams. The fluid streams are directed into the mass transfer column 10 through any number of feed lines (not shown) positioned at appropriate locations along the height of the mass transfer column 10. One or more vapor streams can also be generated within the mass transfer column 10 rather than being introduced into the column 10 through the feed lines. The mass transfer column 10 will also typically include an overhead line (not shown) for removing a vapor product or byproduct and a bottom stream takeoff line (not shown) for removing a liquid product or byproduct from the mass transfer column 10. Other column components that are typically present, such as feed points, sidedraws, reflux stream lines, reboilers, condensers, vapor horns, liquid distributors, and the like, are not illustrated in the drawings because an illustration of these components is not believed to be necessary for an understanding of the present invention.

In accordance with the present invention, one or more structured packing layers 16 comprising individual structured packing sheets 18 are positioned within the open internal region 14 and extend across the horizontal, internal cross section of the mass transfer column 10. In the illustrated embodiment, four structured packing layers 16 are placed in vertically-stacked relationship to each other, but it is to be understood that more or fewer structured packing layers 16 may be provided. In one embodiment, each one of the structured packing layers 16 is formed as a single structured packing module that extends completely across the horizontal, internal cross section of the column 10. In another embodiment, each structured packing layer 16 is formed as a plurality of individual structured packing modules (not shown), referred to as bricks, that are positioned in end-to-end and side-to-side relationship to fill the horizontal, internal cross section of the mass transfer column 10.

The structured packing layers 16 are each suitably supported within the mass transfer column 10, such as on a support ring (not shown) that is fixed to the shell 12, on an underlying one of the structured packing layers 16, or by a grid or other suitable support structure. In one embodiment, the lowermost structured packing layer 16 is supported on a support structure and the overlying structured packing layers 16 are stacked one on top of the other and are supported by the lowermost structured packing layer 16. Successive structured packing layers 16 are typically rotated relative to each other so that the individual structured packing sheets 18 in one of the packing layers 16 are positioned in vertical planes that extend at an angle with respect to the vertical planes defined by the individual structured packing sheets 18 in the adjacent one(s) of the packing layers 16. This rotation angle is typically 45 or 90 degrees, but can be other angles if desired. The height of each structured packing element 16 may be varied, depending on the particular application. In one embodiment, the height is within the range of from about 50 to about 400 mm.

The structured packing sheets 18 in each structured packing layer 16 are positioned in an upright, parallel relationship to each other. Each of the structured packing sheets 18 is constructed from a suitably rigid material, such as any of various metals, plastics, or ceramics, having sufficient strength and thickness to withstand the processing conditions experienced within the mass transfer column 10. Each of the structured packing layers 18 presents a front and back surface, of which all, or a portion, may be generally smooth and free of surface texturing, or which may include various types of texturing, embossing, grooves, or dimples. The configuration of the surfaces of the packing sheets 18 depends on the particular application in which the packing sheets 18 are to be used and may be selected to facilitate spreading and thereby maximize contact between the ascending and descending fluid streams.

Figure 2:
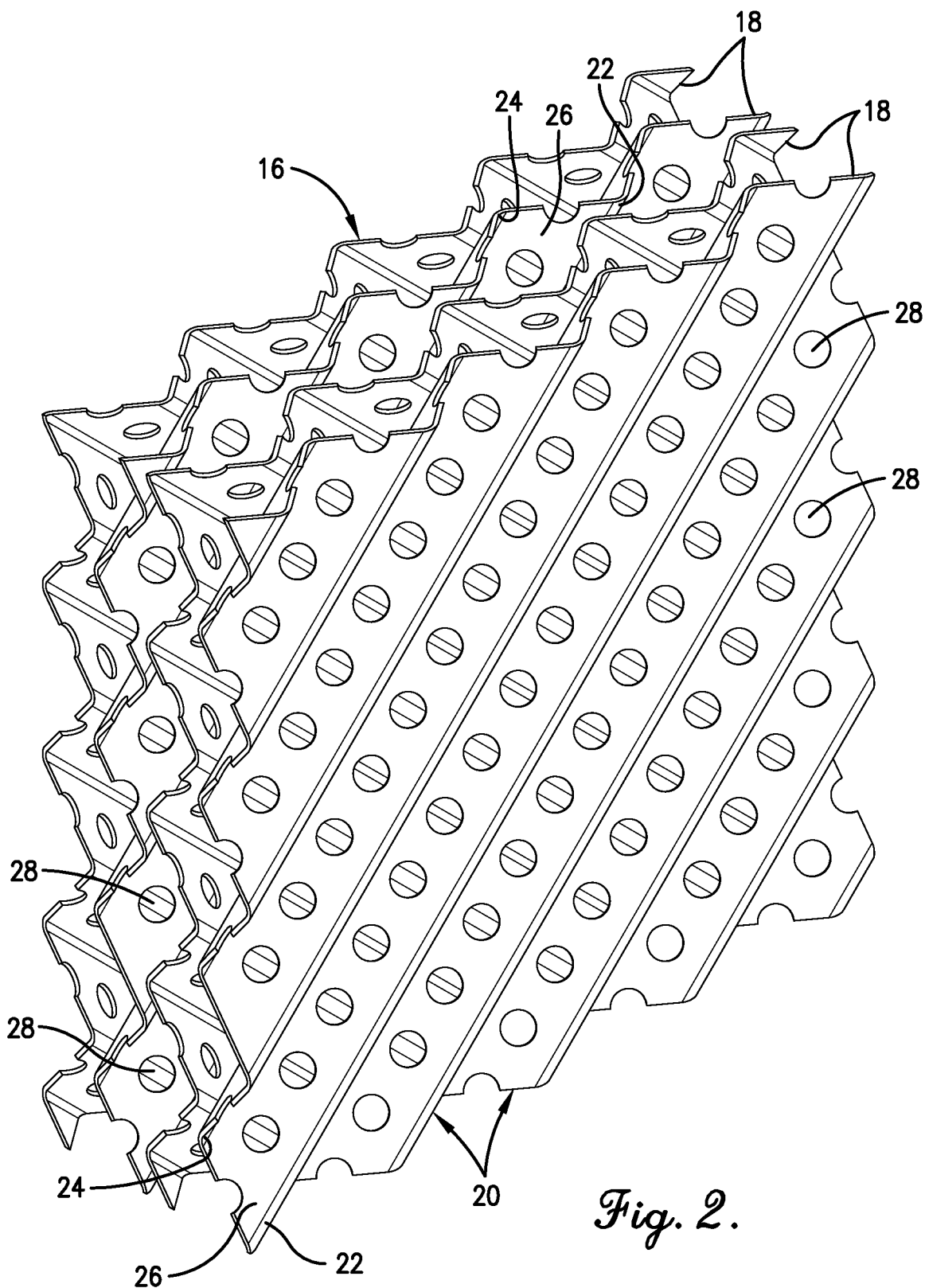
FIG. 2 is a fragmentary front perspective view of a portion of one of the structured packing layers of the type shown in FIG. 1, but shown on an enlarged scale from that shown in FIG. 1 to better illustrate a first embodiment of structured packing sheets that form the structured packing layer.
Figure 3:
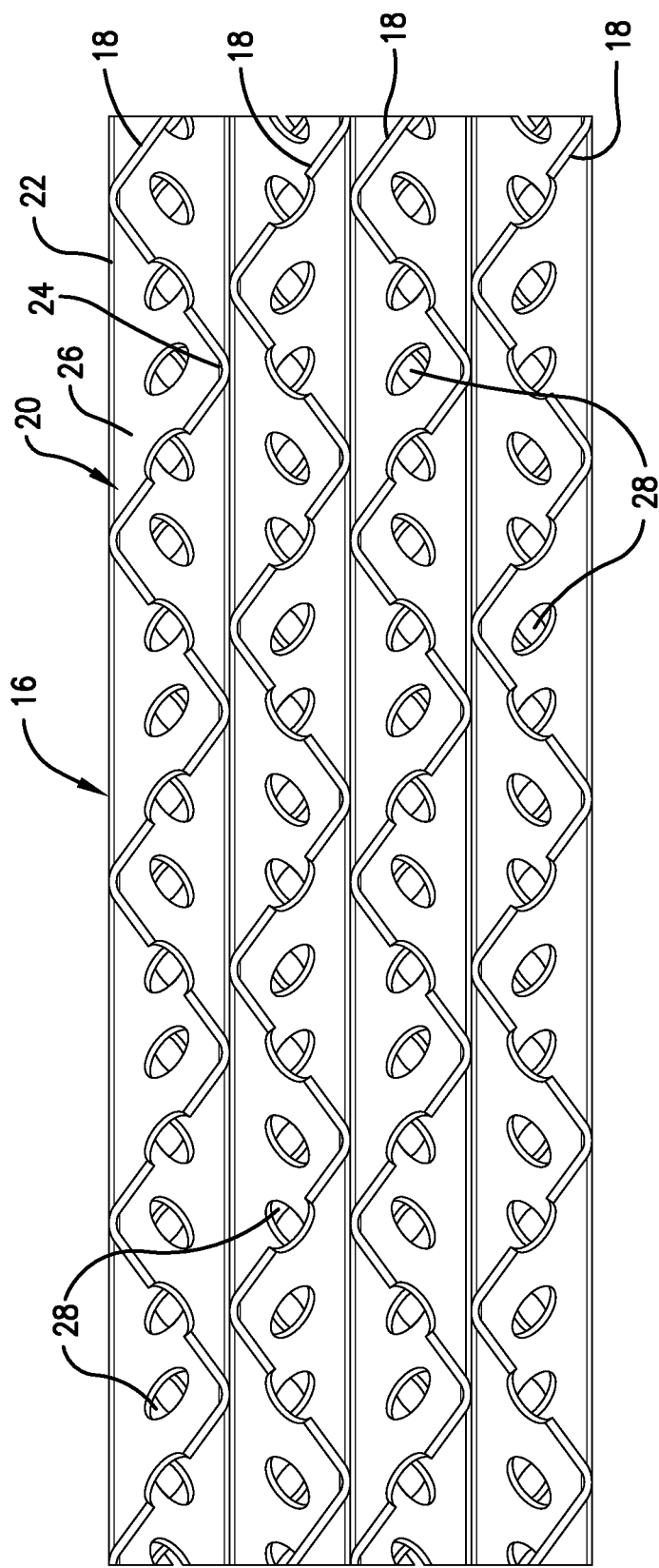
FIG. 3 is a fragmentary side perspective view of the portion of the structured packing layer shown in FIG. 2.
Figure 4:
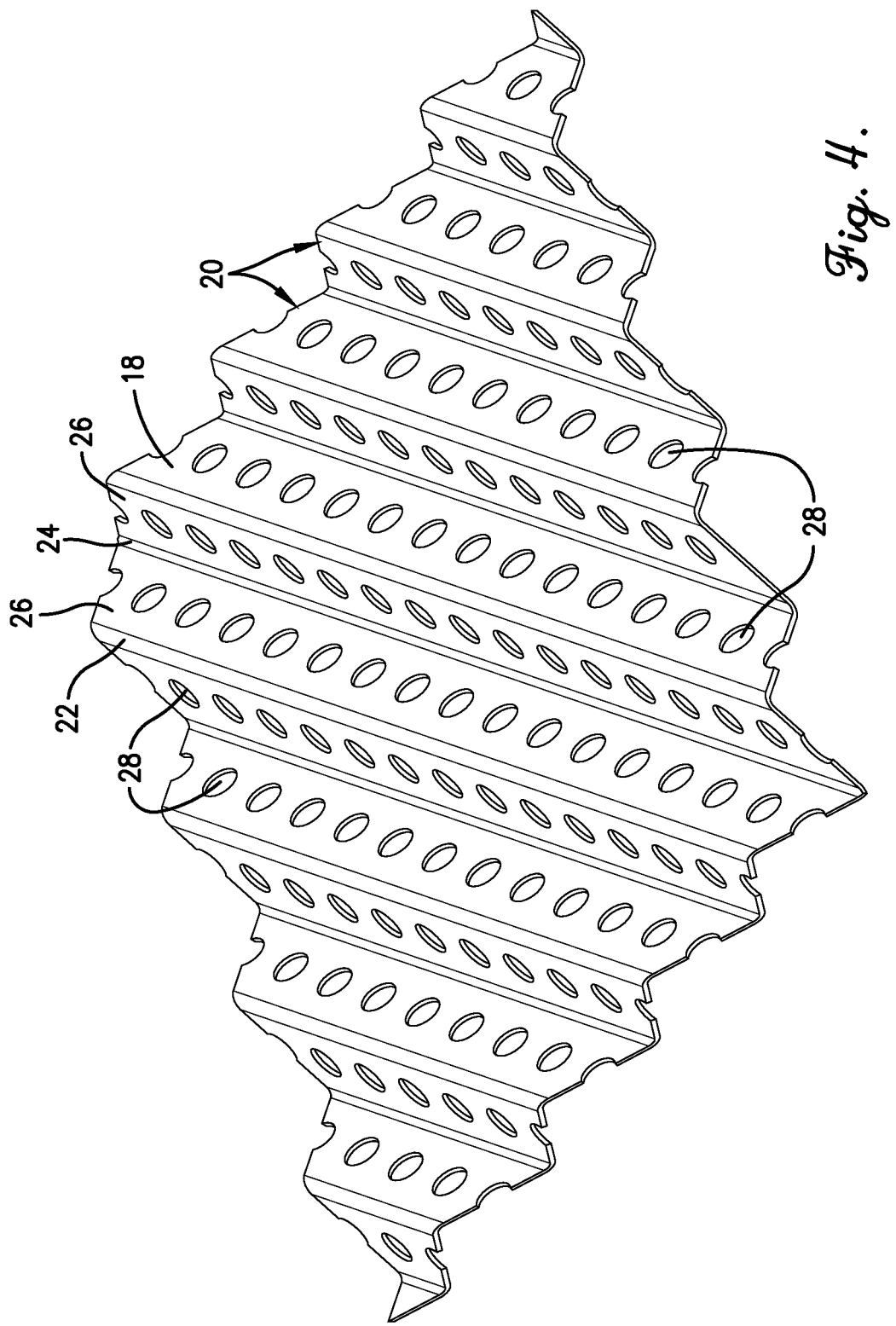
FIG. 4 is a fragmentary perspective view of one of the structured packing sheets shown in FIGS. 2 and 3.
Figure 5:
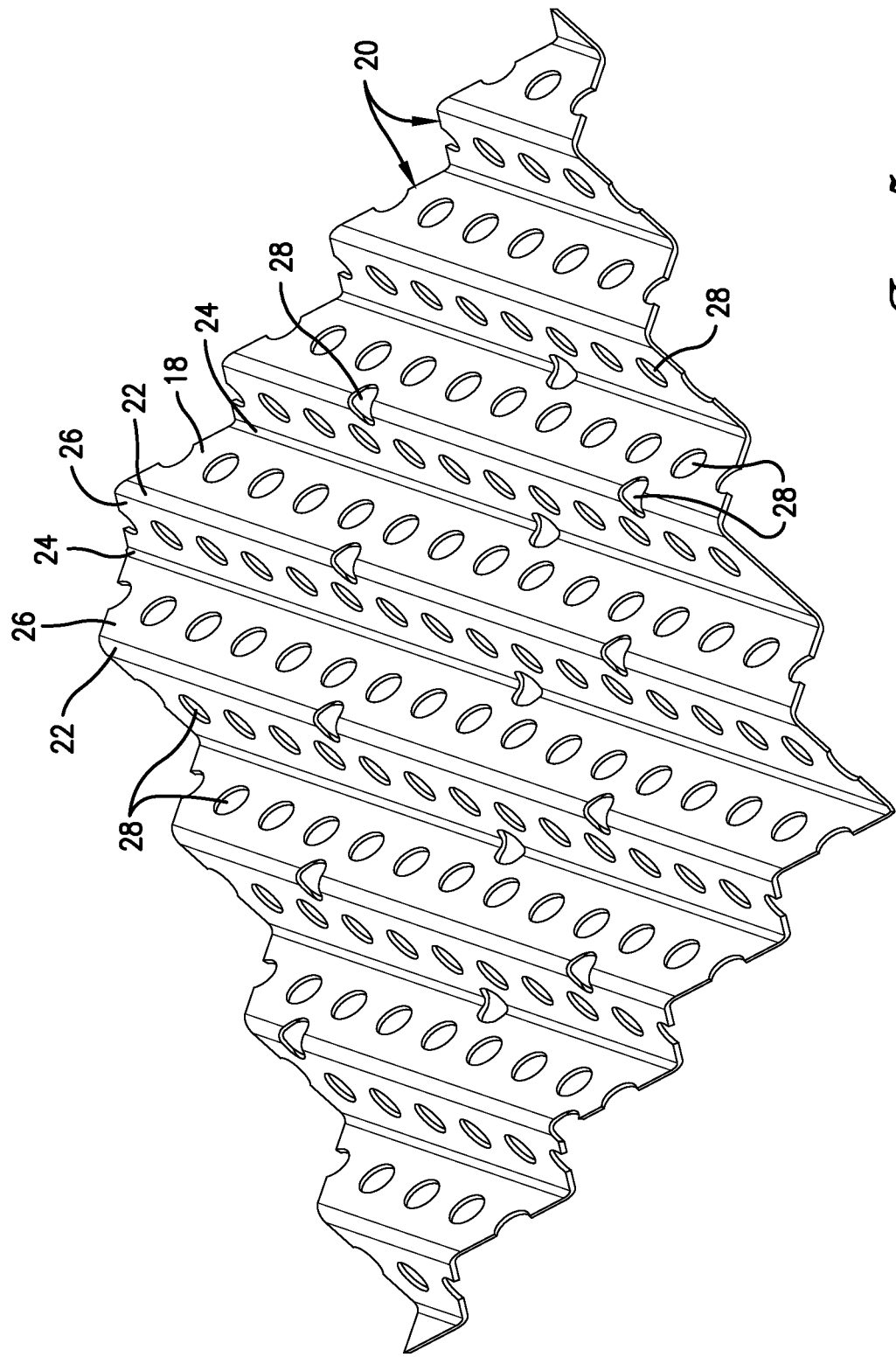
FIG. 5 is a fragmentary perspective view of a second embodiment of a structured packing sheet of the present invention that is similar to that shown in FIG. 4, but has apertures positioned in the peaks and valleys of the corrugations.

Turning additionally to FIGS. 2-4, each of the structured packing sheets 18 has a plurality of parallel corrugations 20 that extend along a portion, or all, of the associated structured packing sheet 18. The corrugations 20 are formed of alternating peaks 22 and valleys 24 and corrugation sidewalls 26 that extend between adjacent ones of the peaks 22 and valleys 24. The peaks 22 on a front side of each structured packing sheet 18 form valleys 24 on an opposite or back side of the structured packing sheet 18. Likewise, valleys 24 on the front sides of each structured packing sheet 18 form peaks 22 on the back side of the structured packing sheet 18. Additional examples of corrugated packing sheets 18 according to various embodiments of the present invention are shown in FIGS. 5-12.

In the illustrated embodiments, the corrugations 20 of each one of the structured packing sheets 18 extend along the entire height and width of the structured packing sheet 18 and are generally of a triangular or sinusoidal cross section. Adjacent ones of the structured packing sheets 18 in each structured packing layer 16 are positioned in facing relationship so that the front side of one of the structured packing sheets 18 faces the back side of the adjacent structured packing sheet 18. The adjacent structured packing sheets 18 are further arranged so that the corrugations 20 in each one of the structured packing sheets 18 extends in a crisscrossing, or cross-corrugated, manner to those in the adjacent one(s) of the structured packing sheets 18. As a result of this arrangement, the corrugations 20 in each one of the structured packing sheets 18 extend at an oblique angle to the corrugations of each adjacent one of the structured packing sheets 18. Some, all or none of the peaks 22 of the corrugations 20 of the front side of each one of the structured packing sheets 18 may be in contact with the valleys 24 on the back side of the adjacent one of the structured packing sheets 18.

The corrugations 20 are inclined in relation to a vertical axis of the mass transfer column 10 at an inclination angle that may be selected for the requirements of particular applications in which the structured packing sheets 18 are to be used. Inclination angles of approximately 30°, approximately 45°, and approximately 60° may be used, as well as other inclination angles that are suitable to a particular intended use of the structured packing layer 16.

The peaks 22, valleys 24 and corrugation sidewalls 26 of the corrugations 20 are normally formed in an automated crimping process by feeding a flat sheet, such as shown in FIGS. 13 and 14, into a crimping press. The peaks 22 and valleys 24 are generally formed as curved arcs that may be defined by an apex radius. In general, as the apex radius increases, the arc of curvature of the peaks 22 and valleys 24 increases and the length of the corrugation sidewalls 26 between the peaks 22 and valleys 24 conversely decreases, for a given specific surface area. The two corrugation sidewalls 26 of each corrugation 20 form an apex angle. Apex radius, apex angle, packing crimp height, and peak 22 to peak 22 length are interrelated, and may be varied to achieve a desired geometry and specific surface area. In general, as crimp height is lowered the number of structured packing sheets 18 contained in each structured packing layer 16 (or module), and the associated specific surface area, increases.

The apex radius, apex angle, and crimp height may be varied for particular applications. In the present invention they are selected so that the specific surface area of the structured packing layer 16 is, in general, greater than 100 $m^2/m^3$.

Each of the structured packing sheets 18 is provided with a plurality of apertures 28 that extend through the structured packing sheet 18 for facilitating vapor and liquid distribution within the packing layer 16. Each aperture 28 provides an open area for permitting the passage of fluid through the associated packing sheet 18. The apertures 28 formed in each structured packing sheet 18 are substantially unimpeded in that they are open to the adjacent structured packing sheet(s) 18 and are not covered or shielded by structural elements carried by the structured packing sheet 18 in which the apertures 28 are formed that would otherwise restrict or divert the flow of fluid after it passes through the aperture 28. An aperture 28 is not open to the adjacent structured packing sheet 18 nor is it substantially unimpeded if a louver or other such structure is placed partially or completely over the aperture 28. An aperture 28 is open and substantially unimpeded even though minor perimeter ridges or "burrs" are present as a result of a punching operation that may be used to form the apertures 28.

When the apertures 28 are open to the adjacent structured packing sheet 18 and are substantially unimpeded in the structured packing layers 16 that have a specific surface area of, in general, greater than 100 $m^2/m^3$, it has been unexpectedly found that particular arrangements of the apertures 28 significantly reduce the pressure drop between the top and bottom edges of the structured packing layer 16, with improved mass transfer efficiency or little to no adverse impact on the mass transfer efficiency of the structured packing layer 16. This results in an overall decrease in pressure drop per theoretical separation stage and improved performance of the structured packing layer 16 during mass transfer processes occurring within the mass transfer column 10.

In general, this beneficial pressure drop and performance result is obtained when the apertures 28 are distributed on the structured packing sheets 18 such that the corrugation sidewalls 26 have a greater density of open areas defined by the apertures 28 than any density of the open areas that may be present in the peaks 22 and valleys 24. In one embodiment, the apertures 28 are only present in the corrugation sidewalls 26. In another embodiment, some of the apertures 28 are present in the peaks 22 and the valleys 24 to interrupt the flow of liquid along the valleys 24 and facilitate its distribution across the corrugation sidewalls 26 and from one side of the structured packing sheet 18 to its opposite side.

Increasing the collective or total open area formed by the apertures 28 when they are positioned with a great density in the corrugation sidewalls 26 and decreasing the size of the apertures 28, which thereby increases the number of the apertures 28, may further reduce the pressure drop per theoretical stage. Further improvements may be achieved by placing these apertures 28 in rows or other patterns that are preferentially aligned in a direction along the longitudinal length of the corrugations 20. Even further improvements may be achieved by increasing the apex radius and/or adjusting the apex angle of the corrugations 20.

Figure 8:
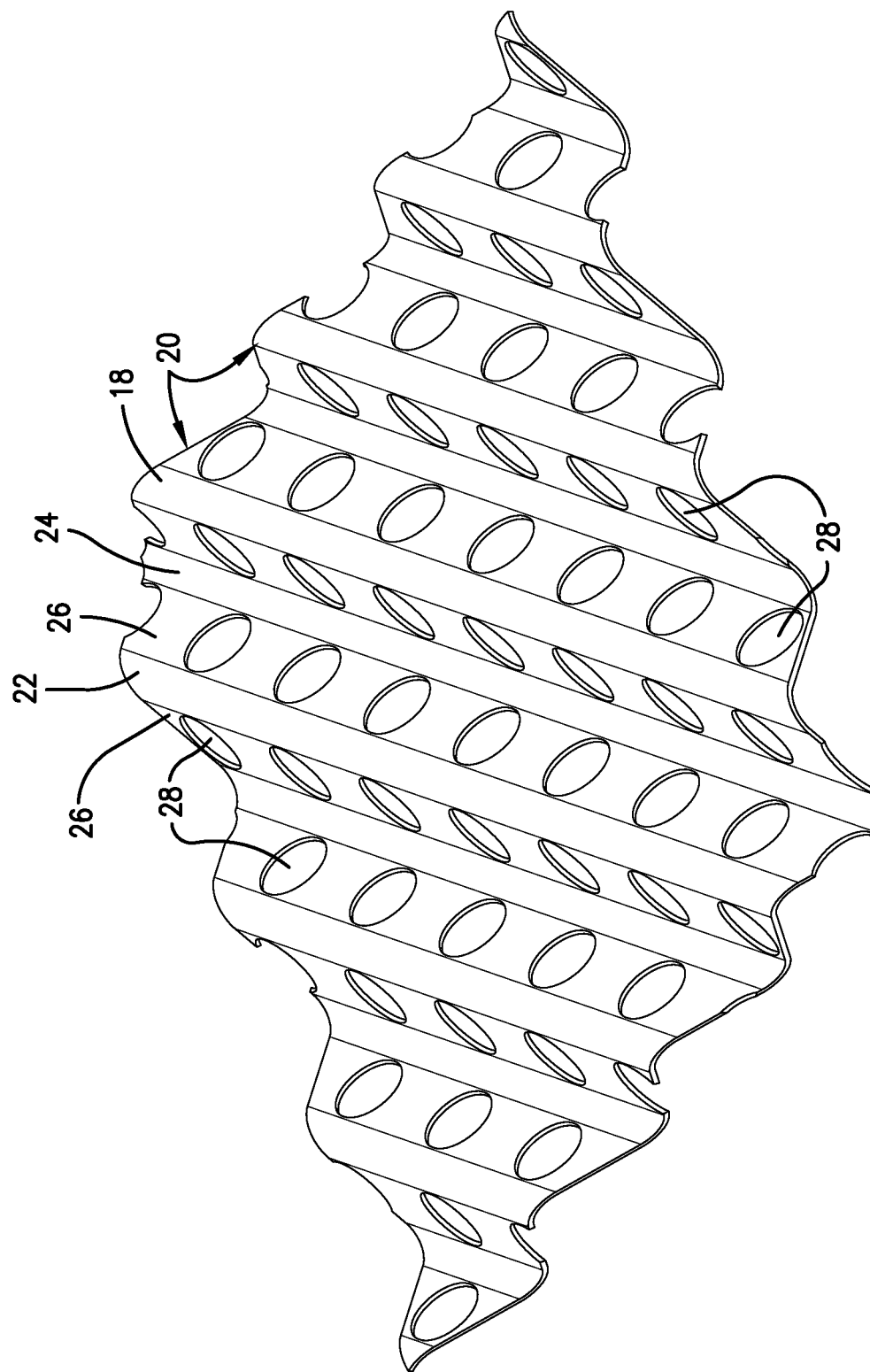
FIG. 8 is a fragmentary perspective view of a fifth embodiment of a structured packing sheet of the present invention having larger apertures and a larger corrugation apex radius than in the embodiment shown in FIG. 4.
Figure 10:
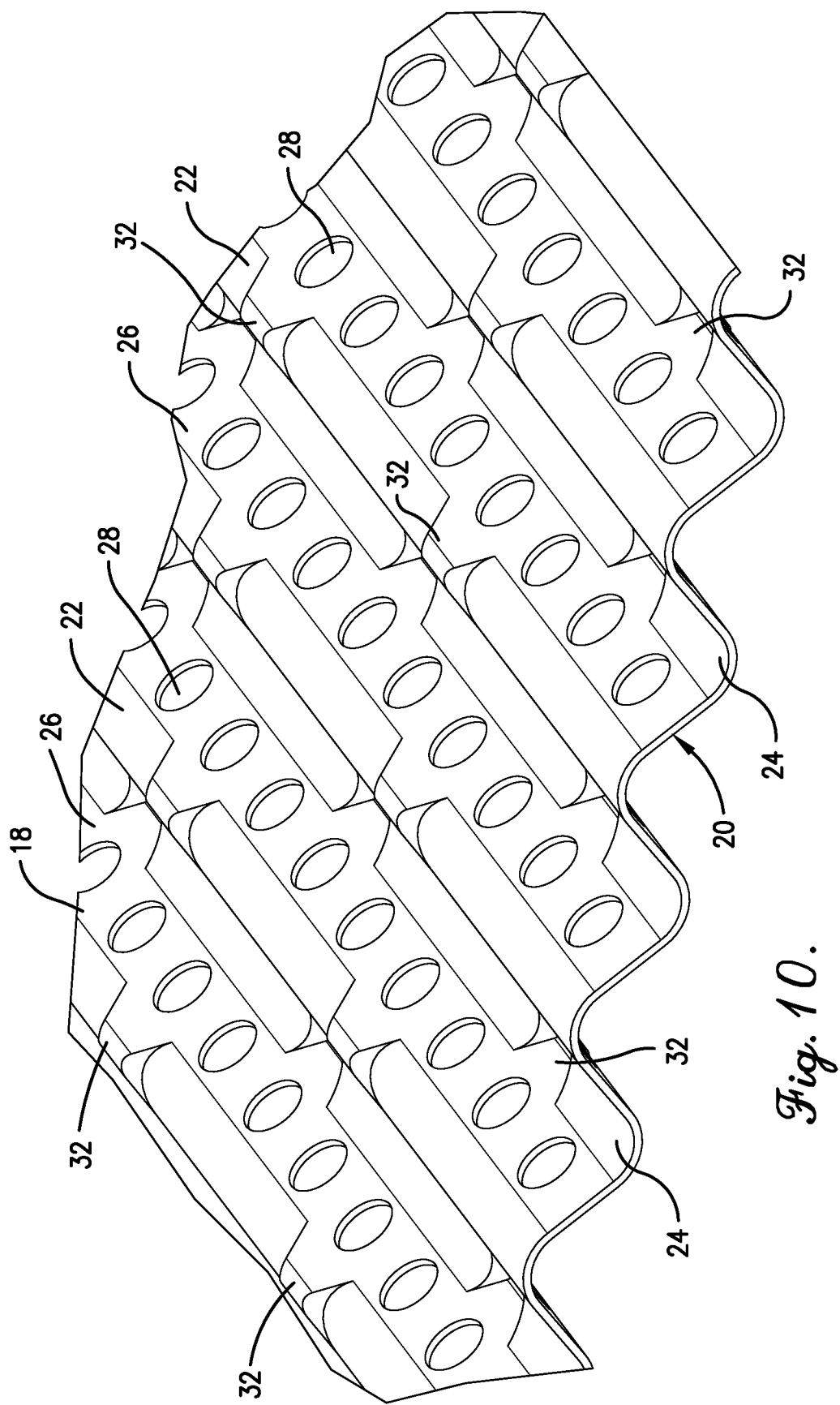
FIG. 10 is a fragmentary perspective view of a seventh embodiment of a structured packing sheet of the present invention with some of the peaks on both sides of the structured packing sheet having both a larger corrugation apex radius and spacers formed from sections of the original, unmodified, smaller radius apex.
Figure 11:
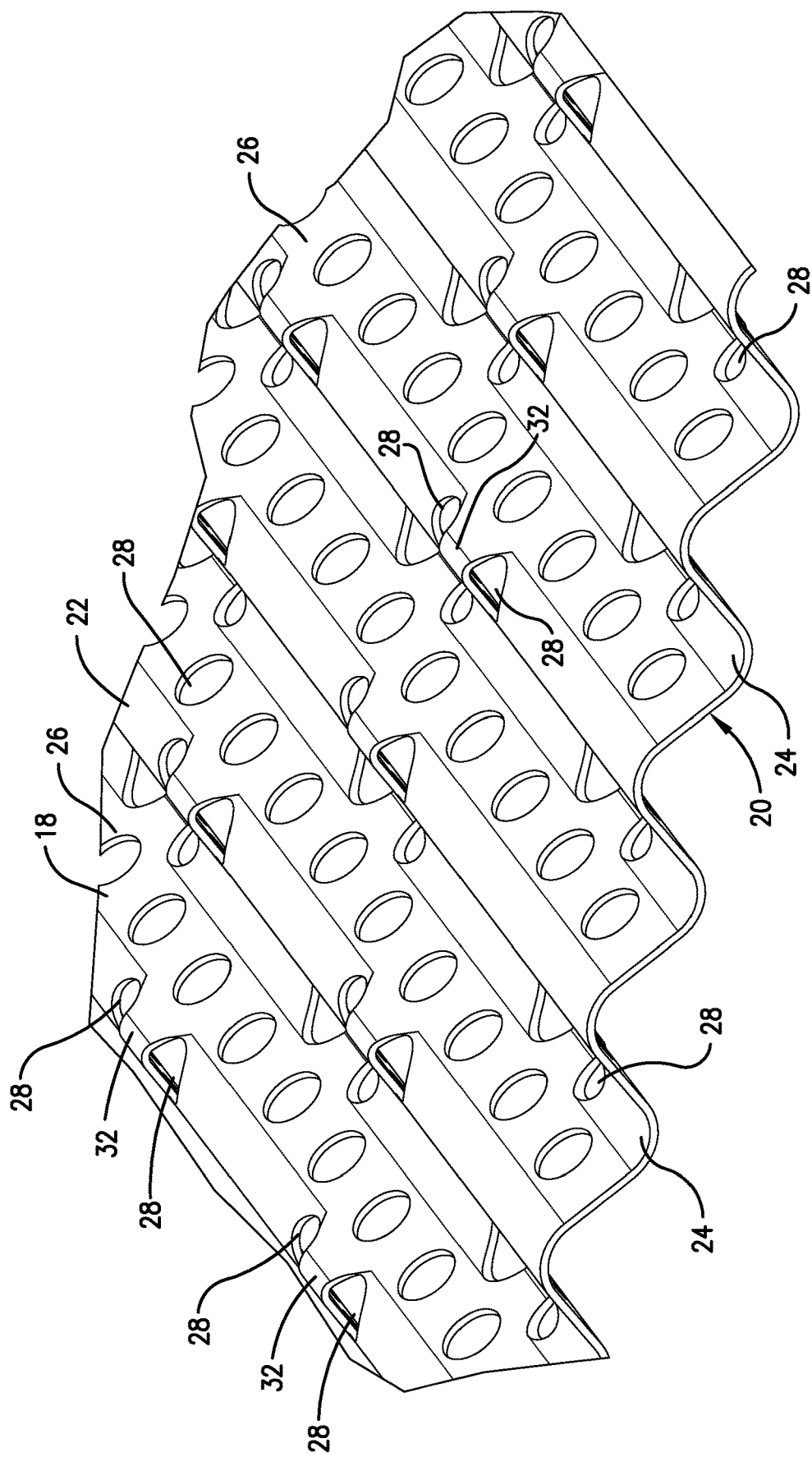
FIG. 11 is a fragmentary perspective view of an eighth embodiment of a structured packing sheet of the present invention that is similar to the embodiment shown in FIG. 10, but with apertures positioned at the transition from the larger apex radius sections to the unmodified, smaller apex radius sections.

To prevent increased liquid accumulation at the contact points between adjacent structured packing sheets 18 that would otherwise result due to the larger apex radii in one embodiment of the current invention, such as shown in FIG. 8, and would be detrimental to mass transfer efficiency, corrugations 20 on adjacent ones of the structured packing sheets 18 in one embodiment may be separated by spacers 32 as shown in FIGS. 10 and 11. In one embodiment, these spacers are formed as sections of some or all of the peaks 22 on the front and/or back side of the structured packing sheets 18 where the larger apex radius modification is not applied and the smaller, unaltered apex radius and corrugation 20 height are retained, thereby forming peaks 22 with dual apex radii as shown in FIGS. 10 and 11. The spacers 32 are positioned at spaced apart locations along some or all of the peaks 22 on at least one side of all or some of the structured packing sheets 18 and contact the facing peaks 22 of the adjacent structured packing sheet 18, thereby preventing contact between adjacent structured packing sheets 18 in the regions incorporating the larger apex radius modification. In one embodiment, the spacers 32 may be formed by depressing portions of the peaks 22, initially having the original, smaller apex radii as shown in FIG. 4, to create the peaks 22 having the larger apex radii as shown in FIG. 10. The spacers 32 are thereby formed by the undepressed sections that retain the unmodified, smaller apex radii and original corrugation 20 height.

The apertures 28 may be positioned along the corrugation sidewalls 26 in various configurations. In one embodiment, the apertures 28 may only be present in the corrugation sidewalls 26 of the packing sheets 18 so that no apertures 28 are present in the peaks 22 or valleys 24. In another embodiment, a sufficient number of apertures 28 may be located on the peaks 22 and valleys 24 to interrupt the flow of liquid along the peaks 22 and valleys 24 and permit at least some of that liquid to drain from one side to the other side of the structured packing sheet 18. Additionally, a majority, or all, of apertures 28 positioned in the corrugation sidewalls 26 may be located closer to the longitudinal center line of the corrugation sidewall 26 than to a peak 22 or valley 24. As a result of this placement, the density of the open areas defined by apertures 28 nearer the center line is greater than the density of the open areas defined by apertures 28 nearer the peaks 22 or valleys 24 on each corrugation sidewall 26. In some applications, it has been found that increasing the density of the open area defined by apertures 28 nearer the center line of the corrugation sidewall 26 reduces the pressure drop with minimal reduction in overall mass transfer, producing an overall improvement in terms of pressure drop per theoretical stage.

The positioning of the apertures 28 along the corrugation sidewall 26 may depend, at least in part, on the size, total open area, and overall spacing of the apertures 28. In some applications, these factors can be adjusted for the structured packing sheet 18 in such a way as to increase the total open area, while minimizing aperture size, such that the total number of apertures 28 per unit area is maximized. This has been found to result in a decrease in the pressure drop per theoretical stage, indicating a desirable improvement in the performance of the structured packing layer 16.

In some applications, the maximum planar dimension of the apertures 28 can be in the range of from about 1 mm to about 13 mm, about 1.5 mm to about 10 mm, about 2 mm to about 8 mm, or about 2.5 mm to about 6 mm. The maximum planar dimension of each aperture 28 is measured along the longest line between two sides of the aperture 28 that passes through the center of the aperture 28. When the aperture 28 has a round shape, the maximum planar dimension is the diameter. Although shown in the drawing figures as having a generally round shape, the apertures 28 may have other shapes, such as a triangular shape, an oblong shape, an oval shape, a rectangular shape, or a square shape. These and other shapes are within the scope of the invention.

In some applications, the open area of each of the apertures 28 may be minimized such that individual apertures 20 have an open area of not more than about 80 $mm^2$, not more than about 50 $mm^2$, or not more than about 30 $mm^2$, but the number of apertures per unit area may be maximized so that the total open area of each of packing layers 18 is in the range of from about 6 to about 20 percent, about 8 to about 18 percent, about 10 to about 16 percent, or about 11 to about 15 percent, based on the total surface area of the associated packing sheet 18.

The apertures 28 may be arranged along each of the corrugation sidewalls 26 in one or more spaced apart rows that extend in a direction substantially parallel to the direction of longitudinal extension of the peaks and valleys. As best shown in FIGS. 13 and 14, which depict a packing sheet 18 prior to being folded, the rows of apertures 28 may be spaced apart from one another and extend in a direction substantially parallel to the direction of extension of the corrugation fold lines 30. As a result, the rows of apertures 28 may extend at an oblique angle with respect to the edges of the packing layer. The total number of rows present on each corrugation sidewall can be at least one, at least two, or at least three, with the particular arrangement varying depending on the particular application. Apertures 28 should preferably not be arranged in a random pattern with respect to the corrugations 20 and may or may not be parallel to the edges of the packing sheet 18.

Figure 6:
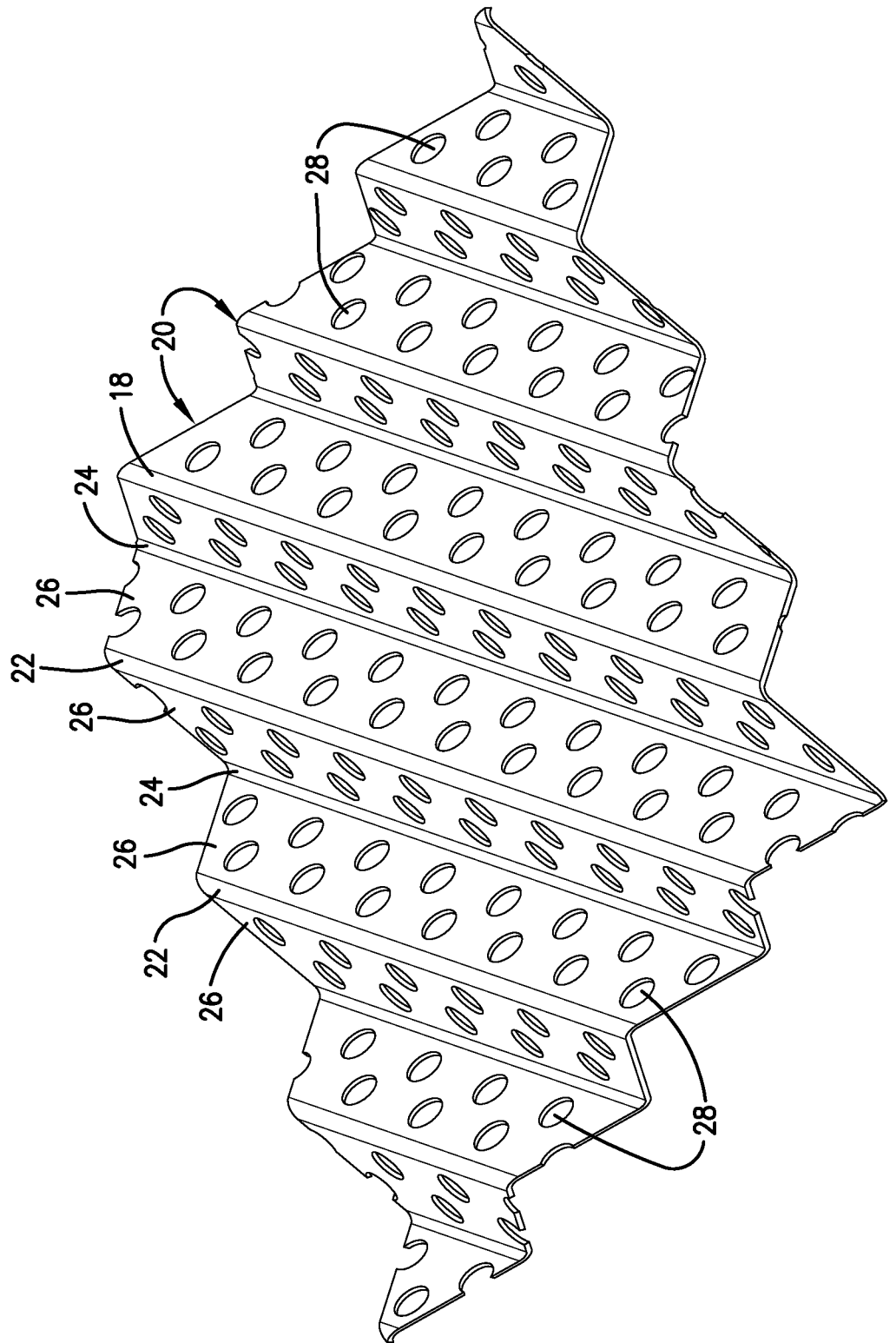
FIG. 6 is a fragmentary perspective view of a third embodiment of a structured packing sheet of the present invention having two rows of apertures on each corrugation sidewall.
Figure 7:
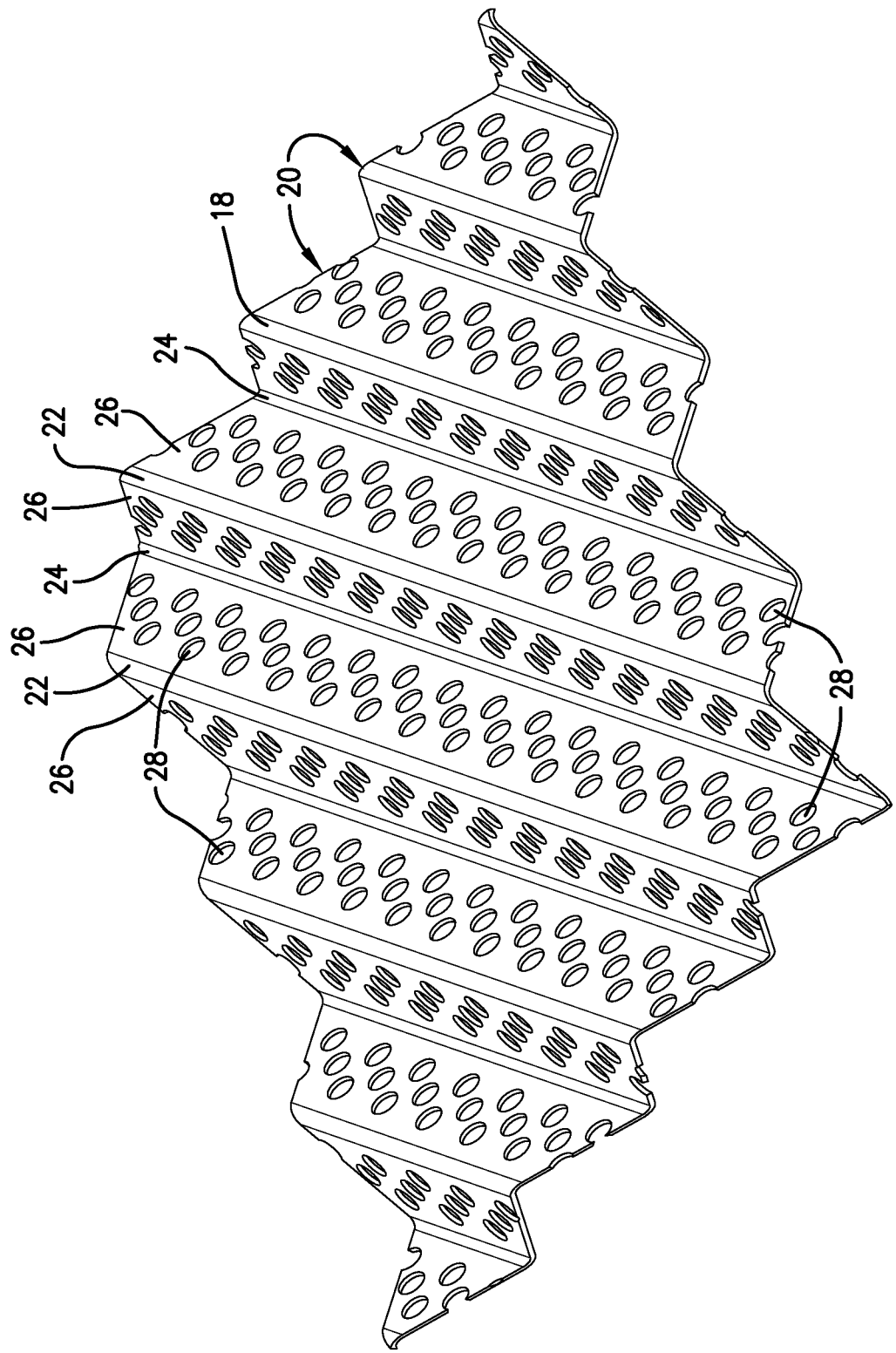
FIG. 7 is a fragmentary perspective view of a fourth embodiment of a structured packing sheet of the present invention having three rows of apertures on each corrugation sidewall.
Figure 9:
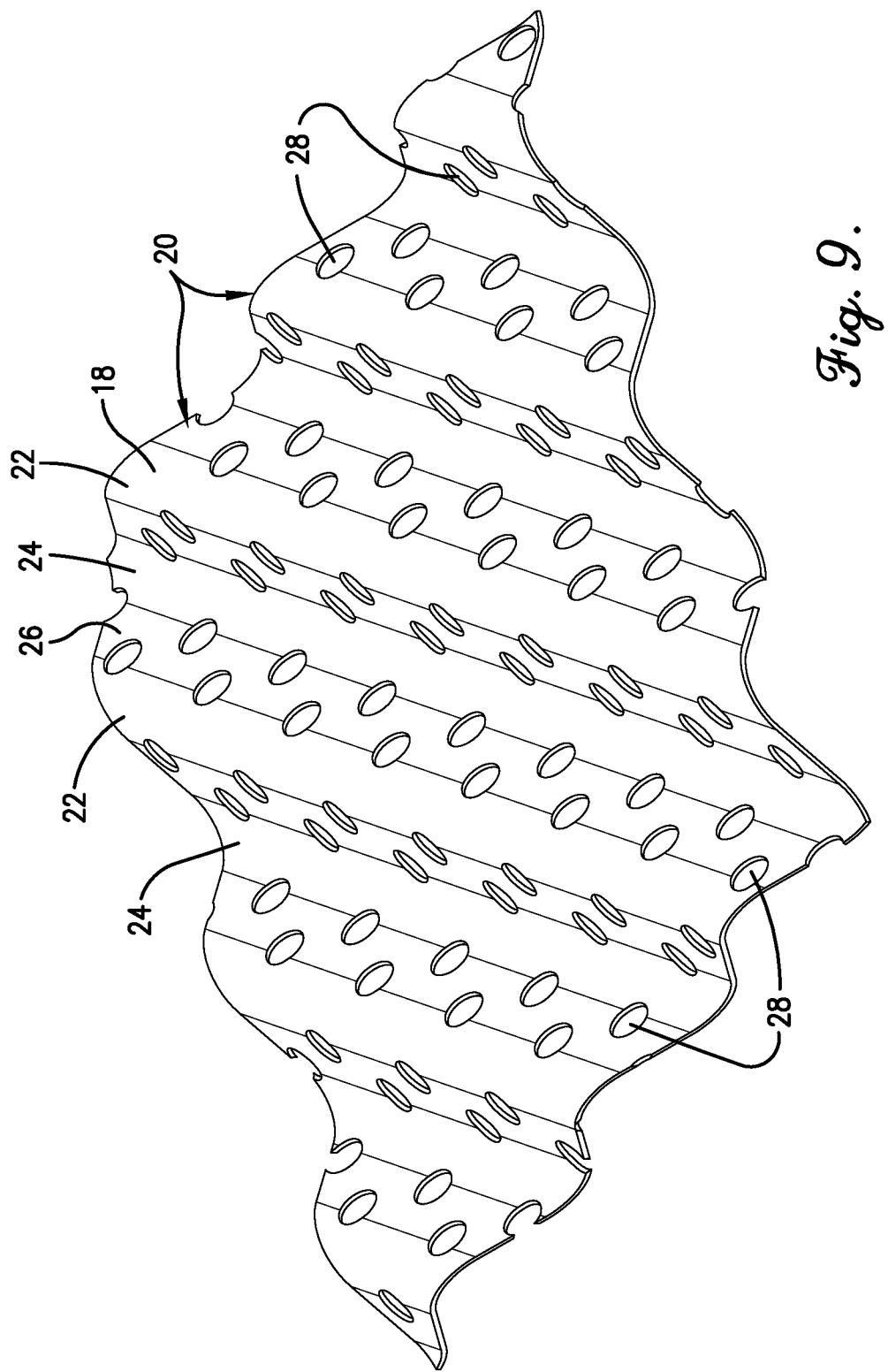
FIG. 9 is a fragmentary perspective view of a sixth embodiment of a structured packing sheet of the present invention having two rows of apertures and a larger corrugation apex radius than in the embodiments shown in FIGS. 1-8.

When apertures 28 are arranged in two or more rows along the corrugation sidewalls 26, apertures 28 in adjacent rows may be aligned with one another (not shown), or the apertures 28 may be staggered from one another in a direction parallel to the direction of extension of the peaks 22 and valleys 24, as shown in FIGS. 6, 7 and 9. In some applications, apertures 28 in adjacent rows may be staggered from one another along the center line of the corrugation sidewall 26. The spacing between adjacent apertures 28 may vary depending on the application, and can, for example, be in the range of between 1 mm to 20 mm, between 2 mm to 15 mm, or between 3 mm to 10 mm, when measured between consecutive edges of adjacent apertures.

In one embodiment, the packing layers 18 may have an apex angle in the range of 70 to 120°. In another embodiment, they may have an apex angle of 80 to 115°. In a further embodiment, they may have an apex angle of 90° to 110°. In various embodiments, the apex radius may be in the range of about 1 mm to about 15 mm, or about 1.5 mm to about 10 mm, or about 2 mm to about 8 mm.

It has been found to be generally desirable to prevent contact between at least some or most of the corrugations 20 of each structured packing sheet 18 and those on adjacent structured packing sheets 18 by a distance greater than or equal to at least the thickness of the liquid film that is intended to flow along the corrugations 20 to prevent undesired liquid accumulation at the contact points where the corrugations 20 of one structured packing sheet 18 contact the corrugations 20 of an adjacent one of the structured packing sheets 18 that would be exacerbated in structured packing sheets 18 having larger apex radii. For example, the distance between the peaks 22 on the front side of one structured packing sheet 18 and the peaks 22 on the back side of the adjacent structured packing sheet 18 may be in the range of between 0.25 mm to 3 mm, between 0.35 mm to 2.5 mm, or between 0.45 mm to 2 mm. This reduction in contact between the larger radius peaks 22 of the corrugations 20 may be achieved by the spacers 32, such as those formed by the undepressed sections of the peaks 22 as shown in FIGS. 10 and 11 that are positioned at spaced-apart locations along all or some of the peaks 22 of one or both sides of all or alternate ones of the structured packing sheets 18. The length and spacing of the spacers 32 are selected so that they contact only some of the facing peaks 22 or spacers 32 in the adjacent structured packing sheets 18 when they are assembled into the structured packing layer 16. In order to facilitate deformation of the flat sheet during formation of the corrugations 20 and the spacers 32, some of the apertures 28 may be positioned at the transitions between the depressed portions of the peaks 22 and the spacers 32, thereby forming peaks 22 with dual apex radii and apertures 28 at the transition from large to small radii as shown in FIG. 11.

In use, one or more of the structured packing layers 16 are assembled from the structured packing sheets 18 and are positioned within the open internal region 14 within the mass transfer column 10 for use in facilitating mass transfer and/or heat exchange between fluid streams flowing counter currently within the open internal region 14. As the fluid streams encounter the structured packing sheets 18 in the one or more structured packing layers 16, the fluid streams spread over the surfaces of the structured packing sheets 18 to increase the area of contact and, thus, the mass transfer and/or heat exchange between the fluid streams. A fluid stream, typically a liquid stream, descends along the inclined surface of the corrugations, while another fluid stream, typically a vapor stream, is likewise able to ascend in the open spacing between the adjacent structured packing sheets 18 and contact the descending fluid stream to affect heat and/or mass transfer. The apertures 28 in the structured packing sheets 18 facilitate vapor distribution within the structured packing layer 16 and also act as a liquid distributor for controlling the pattern of liquid to aid liquid distribution as the liquid moves across the structured packing sheets 18, and to facilitate passage of liquid from one side of the packing sheet to the other. The size, shape, and distribution of apertures 28 herein may be specifically configured as described above to reduce the pressure drop between top and bottom edges of structured packing layers 16 with a surprising increase or only a minimal, if any, reduction in separation efficiency, thereby resulting in an overall enhanced performance of the structured packing layer 16 in the mass transfer column 10.

The invention is further illustrated by reference to the following table showing normalized results of computational fluid dynamics simulations for conventional structured packing sheets A-E and inventive structured packing sheets 1-10 that incorporate various features of the present invention. The information presented in the table is provided by way of illustration and nothing therein should be taken as a limitation upon the overall scope of the invention.

| Structured Packing Sheet | Specific Surface Area (m²/m³) | Inclination Angle (degrees) | Nominal Crimp Height (mm) | Apex Angle (degrees) | Apex Bend Radius (mm) | Apex Features | Aperture Size (mm) | Total Open Area (%) | Aperture Location | Relative DP | Relative HETP | Relative DP/Stage |
|---|---|---|---|---|---|---|---|---|---|---|---|---|
| Conventional A | 220 | 40 | 12.5 | 90 | 1.3 | None | 4 | 11 | Random relative to peaks and valleys | 1 | 1 | 1 |
| Inventive 1 | 220 | 40 | 12.5 | 90 | 1.3 | None | 3 | 15 | Random relative to peaks and valleys | 1.04 | 0.92 | 0.95 |
| Inventive 2 | 220 | 40 | ~12.5 | 90 | 5 | Larger radius | 4 | 11 | On corrugation sidewalls | 0.94 | 1.00 | 0.94 |
| Inventive 3 | 220 | 40 | 12.5 | 90 | 5 & 1.3 | Dual apex radii and apertures at the transition from large to small radii | 4 | 15 | On corrugation sidewalls | 0.88 | 0.97 | 0.85 |
| Inventive 4 | 220 | 40 | 12.5 | 90 | 5 & 1.3 | Dual apex radii and apertures at the transition from large to small radii | 3 | 15 | On corrugation sidewalls | 0.89 | 0.91 | 0.82 |
| Conventional B | 220 | 60 | 12.5 | 90 | 1.3 | None | 4 | 11 | Random relative to peaks and valleys | 1 | 1 | 1 |
| Inventive 5 | 220 | 60 | 12.5 | 90 | 5 & 1.3 | Dual apex radii and apertures at the transition from large to small radii | 3 | 15 | On corrugation sidewalls | 0.95 | 0.95 | 0.90 |
| Conventional C | 125 | 50 | 24 | 90 | 5 | None | 4 | 11 | Random relative to peaks and valleys | 1 | 1 | 1 |
| Inventive 6 | 125 | 50 | 24 | 90 | 8 & 5 | Dual apex radii and apertures at the transition from large to small radii | 4 | 15 | On corrugation sidewalls | 0.98 | 0.96 | 0.94 |

-continued

| Structured Packing Sheet | Specific Surface Area (m²/m³) | Inclination Angle (degrees) | Nominal Crimp Height (mm) | Apex Angle (degrees) | Apex Bend Radius (mm) | Apex Features | Aperture Size (mm) | Total Open Area (%) | Aperture Location | Relative DP | Relative HETP | Relative DP/Stage |
|---|---|---|---|---|---|---|---|---|---|---|---|---|
| Conventional D | 500 | 40 | 6.5 | 90 | 1 | None | 4 | 11 | Random relative to peaks and valleys | 1 | 1 | 1 |
| Inventive 7 | 500 | 40 | 6.5 | 90 | 2 & 1 | Dual apex radii and apertures at the transition from large to small radii | 3.8 | 15 | On corrugation sidewalls | 0.81 | 0.95 | 0.77 |
| Conventional E | 350 | 40 | 8 | 90 | 1 | None | 4 | 11 | Random relative to peaks and valleys | 1 | 1 | 1 |
| Inventive 8 | 350 | 40 | 8 | 90 | 3 & 1 | Dual apex radii and apertures at the transition from large to small radii | 3.5 | 15 | On corrugation sidewalls | 0.85 | 0.93 | 0.79 |
| Inventive 9 | 350 | 40 | 8 | 70 | 3 & 1 | Dual apex radii and apertures at the transition from large to small radii | 3.5 | 15 | On corrugation sidewalls | 0.78 | 0.96 | 0.75 |
| Inventive 10 | 350 | 40 | 8 | 120 | 3 & 1 | Dual apex radii and apertures at the transition from large to small radii | 3.5 | 15 | On corrugation sidewalls | 0.69 | 0.98 | 0.68 |

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A structured packing module comprising:
a plurality of structured packing sheets positioned in an upright, parallel relationship to each other, each structured packing sheet having corrugations formed of alternating peaks and valleys and corrugation sidewalls that extend between adjacent ones of the peaks and valleys, the structured packing sheets being constructed and arranged such that the corrugations of each one of the structured packing sheets extend at an oblique angle to the corrugations of each adjacent one of the structured packing sheets and a specific surface area of the structured packing sheets in the structured packing module is generally greater than 100 m²/m³,
wherein at least some of the peaks on a front side of each one of the structured packing sheets are in contact with the valleys on a facing back side of any adjacent one of the structured packing sheets; and
a plurality of apertures in the structured packing sheets for allowing passage of fluid through the structured packing sheets, the apertures in each one of the structured packing sheets being open to each adjacent one of the structured packing sheets and being substantially unimpeded, the apertures being distributed in each one of the structured packing sheets such that the corrugation sidewalls have a greater density of open areas formed by the apertures than any density of any of the open areas that may be present in the peaks and valleys,
wherein said apertures are distributed to reduce a pressure drop between a top and bottom edge of the structured packing module by their placement such that a greater density of said open areas is present nearer the center lines of said corrugation sidewalls than any density of any open areas that may be present nearer to said peaks and valleys.

2. The structured packing module of claim 1, wherein said apertures are only present in the corrugation sidewalls.

3. The structured packing module of claim 1, wherein in each of said corrugation sidewalls said apertures are arranged in two or more spaced apart rows that extend in a direction generally parallel to the direction of longitudinal extension of said peaks and valleys.

4. The structured packing module of claim 3, wherein the corrugations of each of said packing sheets have an apex angle in the range of from 70° to 120°.

5. The structured packing module of claim 1, wherein the open area of each of said structured packing sheets is in the range of from about 6 to about 20 percent, based on the total surface area of the associated packing sheet.

6. The structured packing module of claim 1, wherein each of said apertures has a maximum planar dimension in the range of 1 mm to 13 mm.

7. The structured packing module of claim 1, wherein said apertures have a round shape.

8. The structured packing module of claim 1, including spacers on said peaks that contact only some of the peaks on the facing side of an adjacent one of the structured packing sheets.

9. The structured packing module of claim 8, wherein said spacers are formed as sections of said peaks having a smaller apex radius than adjacent depressed sections of said peaks that have a larger apex radius.

10. The structured packing module of claim 9, wherein some of said apertures are positioned at transitions from said depressed sections of said peaks to said sections of said peaks having a smaller apex radius.

11. The structured packing module of claim 1, wherein some of said apertures are positioned in said peaks and valleys.

12. The structured packing module of claim 1, wherein said corrugations have an apex radius in the range of from 1 mm to 15 mm.

13. The structured packing module of claim 1, wherein said apertures are only present in the corrugation sidewalls and wherein said apertures are arranged in two or more rows that extend in a direction generally parallel to the direction of extension of said peaks and valleys, wherein the open area of each of said packing sheets is in the range of from 11 to 15 percent, based on the total surface area of the associated packing sheet and each of said apertures has a maximum planar dimension in the range of from 2 mm to 8 mm, wherein said corrugations have an apex angle in the range of from 70° to 120° and an apex radius in the range of 1 mm to 15 mm, and wherein at least a portion of the corrugations of adjacent packing sheets are spaced apart from one another.

14. A mass transfer column comprising:
a shell defining an open internal region; and
at least one structured packing module of claim 1 within said open internal region.

15. The mass transfer column of claim 14, wherein said apertures are only present in the corrugation sidewalls.

16. The mass transfer column of claim 14, wherein said apertures are arranged in two or more spaced apart rows that extend in a direction generally parallel to the direction of longitudinal extension of said peaks and valleys.

17. The mass transfer column of claim 14, wherein the open area of each of said structured packing sheets is in the range of 6 to 20 percent, based on the total surface area of the associated packing sheet.

18. The mass transfer column of claim 14, wherein each of said apertures has a maximum planar dimension of not more than 6 mm.

19. The mass transfer column of claim 14, wherein said corrugations have an apex angle of at least 70° and an apex radius of at least 1 mm.

20. The mass transfer column of claim 14, wherein said apertures are only present in the corrugation sidewalls and said apertures are arranged in one or more rows that extend in a direction generally parallel to the direction of extension of said peaks and valleys, wherein the open area of each of said packing sheets is in the range of from 11 to 15 percent, based on the total surface area of the associated packing sheet and each of said apertures has a maximum planar dimension in the range of from 2 mm to 8 mm, wherein said corrugations have an apex angle in the range of from 70° to 120° and an apex radius in the range of from 2 mm to 8 mm, and wherein at least a portion of the corrugations of adjacent packing sheets are spaced apart from one another.

21. A structured packing module comprising:
a plurality of structured packing sheets positioned in an upright, parallel relationship to each other, each structured packing sheet having corrugations formed of alternating peaks and valleys and corrugation sidewalls that extend between adjacent ones of the peaks and valleys, the structured packing sheets being constructed and arranged such that the corrugations of each one of the structured packing sheets extend at an oblique angle to the corrugations of each adjacent one of the structured packing sheets and a specific surface area of the structured packing sheets in the structured packing module is generally greater than 100 $m^2/m^3$,
wherein at least some of the peaks on a front side of each one of the structured packing sheets are in contact with the valleys on a facing back side of any adjacent one of the structured packing sheets; and
a plurality of apertures in the structured packing sheets for allowing passage of fluid through the structured packing sheets, the apertures in each one of the structured packing sheets being open to each adjacent one of the structured packing sheets and being substantially unimpeded, the apertures being distributed in each one of the structured packing sheets to reduce a pressure drop between a top and bottom edge of the structured packing module by their placement such that said apertures are only present in the corrugation sidewalls.

22. A structured packing module comprising:
a plurality of structured packing sheets positioned in an upright, parallel relationship to each other, each structured packing sheet having corrugations formed of alternating peaks and valleys and corrugation sidewalls that extend between adjacent ones of the peaks and valleys, the structured packing sheets being constructed and arranged such that the corrugations of each one of the structured packing sheets extend at an oblique angle to the corrugations of each adjacent one of the structured packing sheets and a specific surface area of the structured packing sheets in the structured packing module is generally greater than 100 $m^2/m^3$,
wherein at least some of the peaks on a front side of each one of the structured packing sheets are in contact with the valleys on a facing back side of any adjacent one of the structured packing sheets; and
a plurality of apertures in the structured packing sheets for allowing passage of fluid through the structured packing sheets, the apertures in each one of the structured packing sheets being open to each adjacent one of the structured packing sheets and being substantially unimpeded, the apertures being distributed in each one of the structured packing sheets to reduce a pressure drop between a top and bottom edge of the structured packing module by their placement such that the corrugation sidewalls have a greater density of open areas formed by the apertures than any density of any of the open areas that may be present in the peaks and valleys,
wherein in each of said corrugation sidewalls said apertures are arranged in two or more spaced apart rows that extend in a direction generally parallel to the direction of longitudinal extension of said peaks and valleys.

* * * * *